Patented Aug. 12, 1952

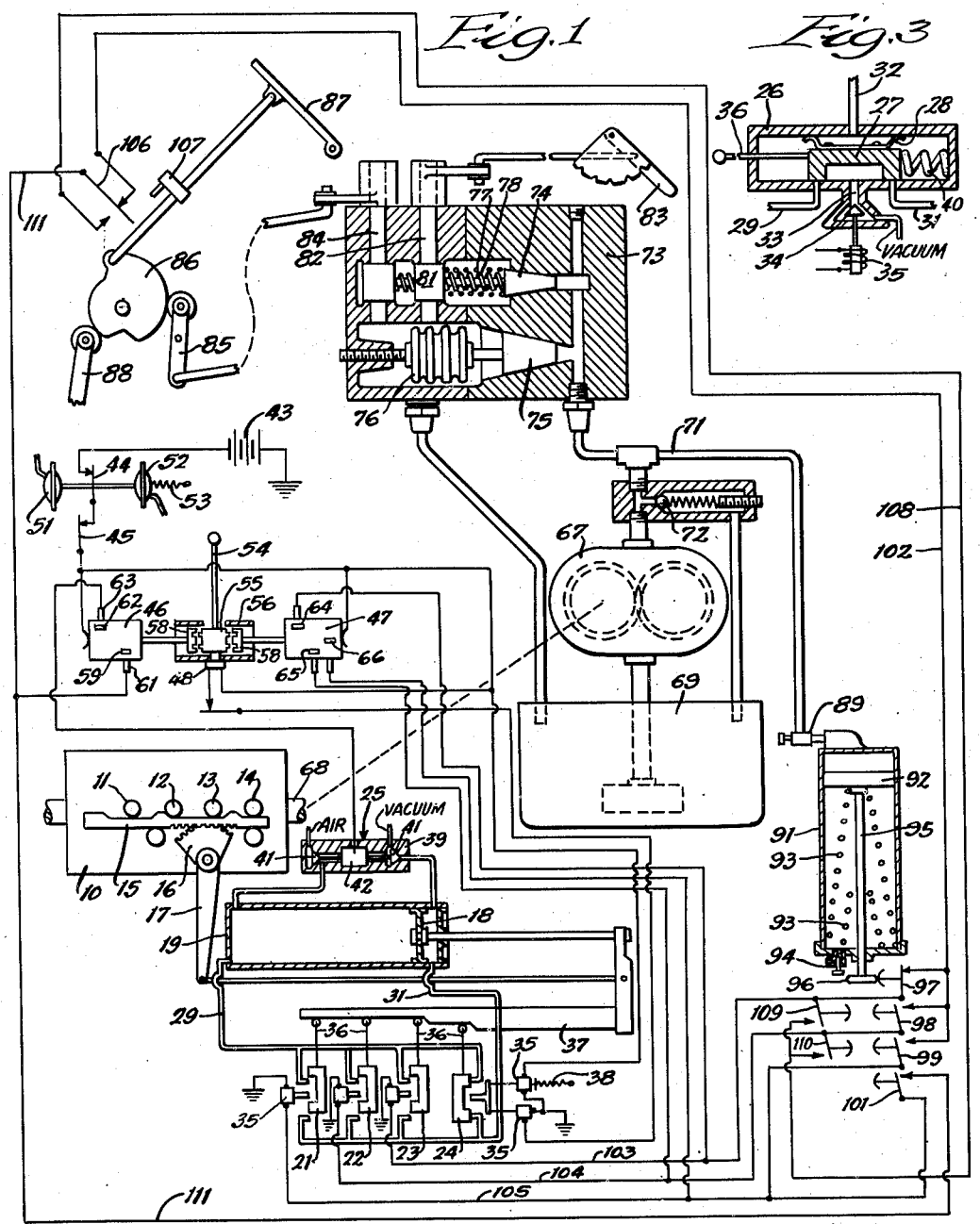

2,606,456

UNITED STATES PATENT OFFICE 2,606,456

SHIFTING MEANS FOR TRANSMISSIONS

Adiel Y. Dodge, Rockford, Ill.

Application November 30, 1946, Serial No. 713,223

17 Claims. (Cl. 74—472)

This invention relates to shifting means for transmissions and more particularly to means for controlling ratio changes in transmissions of the type used in automotive vehicles.

It is one of the objects of the invention to provide a shifting means for transmissions in which the transmission is shifted automatically subject at all times to manual overruling of the automatic control.

Another object is to provide transmission shifting means in which automatic control of the shifting may be effected at regulated rate so that undesirable changes which might be produced by minor or temporary changes in driving conditions will be eliminated.

Still another object is to provide a transmission control in which the speed ratio to which the transmission has been automatically adjusted may be manually reduced to the next lower speed ratio for passing or other emergency operation. Preferably the ratio reduction is accomplished by moving a conventional accelerator pedal or like control member beyond its normal control range.

Still another object is to provide transmission shifting means in which reduction of the transmission speed ratio to a lower ratio is prevented above a predetermined speed. This prevents shifting the transmission to an intermediate speed ratio when the vehicle is traveling at extremely high speeds.

A further object is to provide transmission shifting means in which the transmission is automatically shifted to neutral upon stopping the engine. In the preferred construction shifting into neutral will occur either upon opening the engine ignition switch or upon stalling of the engine with the ignition switch closed.

A still further object is to provide a transmission shifting means in which the transmission is controlled electrically.

The above and other objects and advantages of the invention will be more readily apparent from the following description when read in connection wth the accompanying drawing, in which—

Figure 1 is a diagrammatic view of a transmission shifting means embodying the invention;

Figure 2 is a partial top elevation of the manual shifting mechanism; and

Figure 3 is an enlarged section of one of the motor control valves.

The shifting means as illustrated is somewhat similar to that more particularly described and claimed in my Patent No. 2,372,817 in many of its features and may be utilized to control a transmission of the type illustrated in said patent. As shown in the drawing, the transmission is indicated generally at 10 and may be shifted to different speed ratios by moving one or the other of a series of levers 11, 12, 13 and 14 extending from the transmission casing. Movement of the levers may operate selectively brake members as shown in said Patent No. 2,372,817 to produce any one of several forward driving ratios and a reverse. The levers may be selectively moved by a cam bar 15 having three cam projections thereon and which is slidable in engagement with the levers. In the position shown the cam projections on the cam bar do not engage any of the levers and the transmission is in neutral. As the cam bar is shifted to the right, one of the cam projections will first engage the lever 12 and raise it to shift the transmission into low speed ratio. Further movement to the right will cause the cam projection to disengage the lever 12 and another cam projection to engage and raise the lever 14 to shift the transmission into intermediate ratio. Further movement will disengage the lever 14 and raise the lever 11 to shift the transmission into high speed ratio such as direct drive or overdrive. For reverse the cam bar is shifted to the left to raise the lever 13.

The cam bar is controlled by a gear segment 16 engaging rack teeth on the bottom of the cam bar and which is moved through a lever 17. The lever 17 is connected to the piston 18 of a vacuum motor which includes a cylinder 19. The motor is controlled by a series of valves 21, 22, 23 and 24 for the several forward speed positions and for neutral and by a valve 25 for reverse. By operating one or the other of the several valves the piston 18 will be caused to move to a position in the cylinder 19 to produce the desired speed ratio.

Each of the valves 21 to 24 inclusive may be constructed as shown in Figure 3 with a cylindrical casing 26 closed at its ends and having a hollow valve member 27 slidable therein and urged sealingly against one surface thereof by a spring 28. Connections 29 and 31 extend from ports in the valve which are normally closed by the member 27 in its central position to the opposite ends of the cylinder 19 so that as the valve is shifted one end of the cylinder will be connected to vacuum and the other to atmosphere. For this purpose each valve includes an atmospheric connection 32 venting the valve body 26 externally of the hollow valve 27 and a vacuum connection 33 opening into the interior of the hollow valve member 27. The vacuum connection is controlled by a valve 34 which is normally closed and which is adapted to be opened by a coil 35 when current is supplied to the coil. The position of each of the valve members 27 is determined by a follower 36 which engages a cam bar 37 connected to the piston 18 to move therewith. A spring 40 acts on the valve member 27 to hold the follower 36 in engagement with the cam bar at all times. The cam bar 37 is so shaped that each valve will occupy an off center position so that the appropriate one of its outlet connections will be connected to vacuum and the other of its outlet connections to atmosphere except when the piston 18 is in a position corresponding to the position which that particular valve is to control.

The valve 24 which controls the neutral position has a pair of solenoid valves 35 both controlling the same vacuum connection one of which is normally closed and the other of which is normally opened by a spring 38 and is closed only when its winding is energized. Otherwise all of the valves are substantially the same and function in substantially the same manner.

The reverse valve 25 is of a different type than the remaining valves and includes a valve body 39 having a vacuum connection to one end of the cylinder 19 and an air connection to the opposite end of the cylinder both of which are normally closed by valve members 41. The valve members 41 are adapted to be shifted to open both of the connections simultaneously by a solenoid 42. Thus when the solenoid is energized the right end of the cylinder 19 will be connected to vacuum to move the piston 18 to the right thereby to shift the cam bar 15 to the left and operate the reverse lever 12. It will be noted that the remaining valves 21 to 24 when opened will cause the piston to move to the left of its neutral position shown thereby to shift the cam bar 15 to the right.

The several solenoids are adapted to be energized from any convenient source of current shown as a battery 43. The battery is connected through a switch 44 and a second switch 45 in series to the control circuits. As shown, the circuit beyond the switch 45 is connected through sliding contacts to a pair of contact drums 46 and 47 which are adapted to be operated manually and is further connected through a neutral switch 48 to one of the neutral solenoids 35 and is additionally directly connected to the neutral solenoid 35 whose valve is normally held open by the spring 38. Thus when the switches 44 and 45 are both closed the upper neutral solenoid 35 will be energized to overpower the spring 38 and close its valve. Thus the operation of the motor 19 will be subject to control of the remaining valves for proper shifting.

The switch 45 is preferably connected to the conventional ignition switch of the engine which drives the transmission so that it will be opened when the ignition switch is opened. This will interrupt the circuit to the upper neutral solenoid 35 allowing its spring 38 to open its vacuum valve so that the motor will immediately shift the transmission to neutral whenever the ignition switch is opened to stop the engine. Ordinarily there will be sufficient residual vacuum to accomplish this shift before the engine comes to a complete stop. The switch 44 is controlled in accordance with the engine operation and as shown is connected to a diaphragm 51 subject to engine suction and to a second diaphragm 52 subject to engine pressure. A spring 53 urges the diaphragms in a direction to open the switch, but as soon as the engine is started and as long as it continues in operation the combined effects of engine suctions and exhaust pressure on the diaphragms 51 and 52 will hold the switch 44 closed. In the event of engine stalling or of conditions closely approaching stalling, the spring 53 will overpower the diaphragms and open the switch 44 so that the transmission will immediately shift into neutral. For this purpose the spring 53 may be of sufficient strength relative to the sizes of diaphragms 51 and 52 to open the switch 44 while there is still sufficient residual vacuum to actuate motor 19 for shifting into neutral.

The contact drums 46 and 47 are adapted to be operated manually by means of a shifting lever 54 similar to a convention shift lever. The lever 54 is connected to a plunger 55 which is slidable in a cylinder 56 having an H slot 57 in one side through which the shift lever projects. In its central or neutral position, as shown, the lever lies in the center of the cross bar on the H slot and the plunger 55 engages the neutral switch 48 to close it. This will energize the lower neutral solenoid 35 and cause the transmission to shift to neutral. Each of the contact drums 46 and 47 is connected to a clutch member 58 which is adapted to engage the plunger 55 when it is shifted to one side or the other of its neutral position. When the plunger 55 is shifted to the left, it engages the clutch member for the drum 46 so that rocking of the shift lever forward or backward will turn the drum 46 in one direction or the other. Backward rocking of the shift lever into the lower left portion of the H slot, as seen in Figure 2, will turn the drum 46 downward, as seen in Figure 1, to connect a contact portion 59 thereon with a contact 61. This is the position for automatic operation as described more fully hereinafter. Forward rocking of the shift lever into the upper left portion of the H slot, as seen in Figure 2, will engage a contact 62 on the drum with a wiper 63 which operates the reverse valve. As shown, the wiper 63 is connected to the solenoid 42 so that when the shift lever is moved to this position the reverse valve will be operated to shift the transmission to reverse drive.

The drum 47 provides for manual control of the several forward speed ratios and is formed with three contacts 64, 65 and 66 adapted respectively to engage wipers which are connected to the low speed ratio valve 23, the intermediate speed ratio valve 22 and the high speed ratio valve 21. When the shift lever is moved to the right and forward to the upper right portion of the H slot as seen in Figure 2, it will move the contact 64 into engagement with its wiper to energize the low speed valve 23 and shift the transmission to low speed ratio. When the valve 23 is energized, it will admit vacuum to the left end of the cylinder 19 to cause the piston 18 to move to the left. The cam bar 37 will move with the piston and when the piston has shifted the cam bar 15 to the point to raise the control lever 12, the first cam projection on the bar 37 will engage the follower 36 for valve 23 and shift this valve to its centered position to cut off the vacuum. Thus the piston 18 will stop in the low speed position. Backward movement of the shift lever to a substantially central position will engage the contact 65 with its wiper to energize the intermediate ratio valve 22. Energizing of this valve will admit vacuum to the left of cylinder 19 to cause a further shift of piston 18 to the left until the first cam projection on the cam bar 37 shifts the valve 22 to its centered position. At the same time the second cam projection on the bar 37 shifts the valve 23 further downward to connect its vacuum port 33 with the pipe 31 so that if the valve 23 is again energized it will admit vacuum to the right end of the cylinder 19 and shift piston 18 to the right. Further backward movement of the shift lever will rotate the contact drum to bring the contact 66 into engagement with its wiper to energize the valve 21 and shift the transmission to high speed or direct drive ratio.

Automatic control of the transmission may be provided by a mechanism similar to that more particularly described and claimed in my Patent No. 2,372,817. This mechanism as shown comprises a gear pump 67 which may be driven by the output or driven member of the transmission and is shown as connected to a driven shaft 68 extending from one end of the transmission. The pump receives oil or like liquid from a sump 69 which may be the crank case of the engine and discharges it into an outlet pipe 71. Preferably a pressure limiting relief valve 72 is provided to prevent building up dangerous pressures by the pump. The discharge pipe 71 is connected to a control valve block 73 containing a pair of control valves 74 and 75 which will open more or less to regulate the pressure in the discharge pipe 71. The valve 75 may be controlled by a temperature responsive Sylphon 76 which will open the valve slightly at low temperatures to compensate for increased viscosity of the oil.

The valve 74 is urged closed by two springs 77 and 78. The spring 77 fits against a yoke 81 carried by a shaft 82 which is adapted to be turned by a manually operable adjustment lever 83 to vary the spring tension. The lever 83 may be set to a position for maximum tension of the spring which will cause the pressure in the discharge line 71 to build up rapidly so that the transmission will shift rapidly into high speed ratio for maximum economy operation. Shifting of the lever 83 to its opposite position reduces the spring to minimum tension so that the shift into high speed ratio will not be accomplished until the transmission output shaft reaches a higher speed for maximum performance operation. The lever 83 may be adjusted by the driver to obtain the desired operation in accordance with the particular driving conditions encountered. The spring 78 is controlled by a similar yoke on a shaft 84 which is adapted to be turned by a lever 85 through a cam 86 connected to a pedal 87 which may be the conventional accelerator pedal on the vehicle. The cam 86 can also control a lever 88 which operates a conventional clutch on the vehicle all as described more fully in my Patent No. 2,372,817.

Automatic control of the shifting motor 19 is effected by a mechanism responsive to the pressure developed in the discharge line 71. As shown, the line 71 is connected through an adjustable throttling valve 89 to the upper end of a cylinder 91 which contains a piston 92. The piston is urged upwardly by springs 93 and is adapted to move down in response to the liquid pressure in its upper portion. The lower end of the cylinder 91 is preferably closed and is provided with an adjustable discharge valve 94 through which air will be expelled from the lower end of the cylinder as the piston moves down.

The piston carries a piston rod 95 extending through the lower end of the cylinder and carrying a switch operating head 96. In line with the movement of the head 96 there are arranged a plurality of switches 97, 98, 99 and 101 which are adapted to be successively closed by the head 96 as it moves downward. One terminal of each of the switches is supplied with current from the battery 43 through a wire 102 during automatic operation. The switch 97 is connected through a wire 103 to the low speed valve 23, the switch 98 is connected through a wire 104 to the intermediate speed valve 22 and both of the switches 99 and 101 are connected to the high speed valve 21 through a wire 105. Thus as the switches are successively closed during downward movement of the head 96 the transmission will be successively moved from low speed ratio to intermediate speed ratio and finally to high speed ratio.

The wire 102 is normally connected to the battery through a double throw selector switch 106. The switch 106 will occupy the position shown to energize the wire 102 during normal control movements of the accelerator pedal 87 from closed to open throttle positions. When the accelerator pedal is pressed downward beyond its normal operating range, a finger 107 thereon will engage the switch 106 and move it to a position to de-energize the wire 102 and to energize a wire 108. The wire 108 is connected to one contact of each of a pair of switches 109 and 110 which lie respectively opposite the switches 98 and 99. Thus when the switch 98 is closed, the switch 109 will also be closed, and when the switch 99 is closed, the switch 110 will also be closed. The switch 109 is connected to the wire 103 for the low gear valve 23 and the switch 110 is connected to the wire 104 for the intermediate gear valve 22. Assuming that the transmission is operating in intermediate speed ratio the head 96 will engage and close both of the switches 98 and 109. If the accelerator pedal 87 is within its normal range, the switch 106 will occupy the position shown to energize the wire 102 so that the intermediate valve 22 will be controlled through the switch 98 to shift the transmission to intermediate gear. If without substantially changing the vehicle speed the operator should depress the accelerator pedal fully as, for example, to demand a sudden burst of high power to meet an emergency condition, the switch 106 will be shifted to energize the wire 108. At this time the low speed valve 23 will be operated to shift the transmission immediately into low gear to make additional power available. Similarly, when normally operating in high gear with the head 96 closing both of the switches 99 and 110, the high gear valve 21 will be controlled through the switch 99 as long as the accelerator pedal is somewhere within its normal control range. Upon full depression of the accelerator pedal as, for example, in passing on a hill or the like, the switch 110 will become effective to shift the transmission immediately into intermediate gear.

At extremely high speeds it is undesirable to shift the transmission into a lower gear even under emergency conditions. The switch 101 is provided to prevent this operation and will be engaged and closed by the head 96 when the output shaft of the transmission is turning above a predetermined high speed. It will be noted that this switch is energized directly from the contact 61 through a wire 111 so that it is not affected by the switch 106. Thus when the switch 101 is closed to control the high speed valve 21, the transmission will remain in high speed ratio regardless of operation of the selector switch 106.

The valves 89 and 94 are provided to regulate the sensitivity of the control to minor or temporary speed changes and to prevent rapid shifting of the transmission when a relatively minor speed or load variation or a speed variation of short duration occurs. By adjusting the valve 89 the rate at which liquid can flow into and out of the cylinder 91 can be controlled so that the cylinder can be prevented from moving too rapidly to respond to temporary speed or load changes. The valve 94 similarly controls the rate of flow of air into and out of the lower part of the cylinder to provide an adjustable dashpot effect. By proper adjustment of these valves, the control can be made as sensitive as desired to speed changes so that shifting will occur only after a speed change has been maintained for a proper interval.

It will be noted that in the control as illustrated when the shift lever is in automatic position, the transmission will always be shifted to one of its forward speed ratio positions for use with a transmission of the type shown in my Patent No. 2,372,817 which includes a hydraulic torque converter or a fluid fly wheel. This is entirely satisfactory since the vehicle will not be driven at idling engine speeds even though the transmission is in a driving condition.

While one embodiment of the invention has been shown and described in detail herein, it will be understood that this is illustrative only and is not to be taken as a definition of the scope of the invention, reference being had for this purpose to the appended claims.

What is claimed is:

1. In a transmission shiftable to any one of a plurality of different driving ratios, shifting means comprising a motor connected to the transmission to shift it, control means for the motor, a member movable to different positions, means responsive to the speed of one part of the transmission to move the member, control parts operated by movement of said member to operate the control means, and manually operable means to operate the control means independently of said member and in a manner to overrule operation thereof by said member in the selection of any one of said driving ratios.

2. In a transmission shiftable to any one of a plurality of different driving ratios, shifting means comprising a motor connected to the transmission to shift it, control means for the motor, a member movable to different positions, means responsive to the speed of one part of the transmission to move the member, control parts operated by movement of said member to operate the control means, said member in certain of its positions operating two control parts which will cause the transmission to shift to two different ratios, and manually operable means to render a selected one of the two operated control parts effective.

3. In a transmission shiftable to a plurality of different speed ratios, shifting means comprising a motor connected to the transmission to shift it, a member progressively movable to different positions, means responsive to the speed of a part of the transmission to move the member, control parts for the motor successively operable by said member to increase the speed ratio of the transmission as the speed of said part increases, supplemental control parts operated by said member in certain of its positions to reduce the speed ratio of the transmission below that it normally has in said positions of the member, and manually operable means to make said supplemental control parts effective.

4. In a transmission shiftable to a plurality of different speed ratios, shifting means comprising a motor connected to the transmission to shift it, a member progressively movable to different positions, means responsive to the speed of a part of the transmission to move the member, control parts for the motor successively operable by said member to increase the speed ratio of the transmission as the speed of said part increases, supplemental control parts operated by said member in certain of its positions to reduce the speed ratio of the transmission below that it normally has in said positions of the member, manually operable means to make said supplemental control parts effective, and an auxiliary control part operated by said member above a predetermined speed of said transmission part to maintain the transmission in its maximum speed ratio regardless of the manually operable means.

5. In a transmission shiftable to low, intermediate and high speed ratios, shifting means comprising a motor connected to the transmission to shift it, a member progressively movable to different positions, means responsive to the speed of a part of the transmission to move the member, control switches successively operable by said member to control the motor to increase the speed ratio of the transmission as the speed of said part increases, supplemental switches operated by said member in certain of its positions to control the motor to reduce the speed ratio of the transmission below that it normally has in said positions of the member, and a selector switch to connect either the first named switches or the supplemental switches in circuit to control the motor.

6. In a transmission shiftable to low, intermediate and high speed ratios, shifting means comprising a motor connected to the transmission to shift it, a member progressively movable to different positions, means responsive to the speed of a part of the transmission to move the member, control switches for the motor operable by said member to shift the transmission successively from low to intermediate and then to high speed ratio as the speed of said part increases, a supplemental switch operated by said member in its high speed position to shift the transmission to its intermediate ratio, and a selector switch to connect either the first named switches or the supplemental switch in circuit to control the motor.

7. In a transmission shiftable to low, intermediate and high speed ratios, shifting means comprising a motor connected to the transmission to shift it, a member progressively movable to different positions, means responsive to the speed of a part of the transmission to move the member, control switches for the motor operable by said member to shift the transmission successively from low to intermediate and then to high speed ratio as the speed of said part increases, a supplemental switch operated by said member in its high speed position to shift the transmission to its intermediate ratio, a selector switch to connect either the first named switches or the supplemental switch in circuit to control the motor, and an auxiliary switch operated by said member above a predetermined speed of said part to maintain the transmission in its high speed ratio regardless of the operation of the selector switch.

8. In a transmission shiftable to a plurality of different speed ratios, shifting means comprising a motor connected to the transmission to shift it, a movable member, means responsive to the speed of a part of the transmission to move the member, control means for the motor operated by said member to increase the transmission speed ratio as the speed of the transmission part increases, a manually movable control member having a normal range of control movement in which it affects the transmission speed, and supplemental control means for the motor operated by movement of the control member beyond its normal range to reduce the transmission speed ratio below the normal ratio for a given position of the first named member.

9. In a transmission shiftable to a plurality of different speed ratios, shifting means comprising a motor connected to the transmission to shift it, a movable member, means responsive to the speed of a part of the transmission to move the member, control means for the motor operated by said member to increase the transmission speed ratio as the speed of the transmission part increases, a manually movable control member having a normal range of control movement in which it affects the transmission speed, supplemental control means for the motor operated by movement of the control member beyond its normal range to reduce the transmission speed ratio below the normal ratio for a given position of the first named member, and auxiliary control means operated by the first named member above a predetermined speed of the transmission part to make the supplemental means ineffective.

10. In a transmission shiftable to a plurality of different speed ratios, shifting mechanism comprising a shifting device to shift the transmission means responsive to the speed of a part of the transmission to control said device to shift the transmission successively from lower speed ratios to higher speed ratios as the speed of the part increases, a manually operable control member, means operated by the control member to control said device to shift the transmission from an existing speed ratio to the next lower speed ratio dependent upon the operation of the first named means, and said first named means including means responsive to the speed of said part to make the last named means ineffective above a predetermined speed.

11. In a transmission shiftable to a plurality of different speed ratios and to neutral, shifting means comprising a motor connected to the transmission to shift it, a movable member, means responsive to the speed of a part of the transmission to move the member, electrical means controlled by the member to control the motor to shift the transmission to different speed ratios, electrical means to control the motor to shift the transmission into neutral, and a switch operated in conjunction with the operation of an engine driving the transmission to make the first named electrical means ineffective and the last named electrical means effective when the engine is stopped.

12. In a transmission shiftable to a plurality of different speed ratios and to neutral, shifting means comprising a motor connected to the transmission to shift it, a movable member, means responsive to the speed of a part of the transmission to move the member, electrical means controlled by the member to control the motor to shift the transmission to different speed ratios, electrical means to control the motor to shift the transmission into neutral, a circuit to energize the electrical means, the first named electrical means controlling the motor when energized and the last named electrical means controlling the motor when de-energized, and a switch in the circuit simultaneously to de-energize all of the electrical means.

13. In a transmission shiftable to a plurality of different speed ratios and to neutral, shifting means comprising a motor connected to the transmission to shift it, a movable member, means responsive to the speed of a part of the transmission to move the member, electrical means controlled by the member to control the motor to shift the transmission to different speed ratios, electrical means to control the motor to shift the transmission into neutral, a circuit to energize the electrical means, the first named electrical means controlling the motor when energized and the last named electrical means controlling the motor when de-energized, and a switch in the circuit operable in conjunction with the operation of an engine driving the transmission to de-energize all of the electrical means when the engine is stopped.

14. In a transmission shiftable to a plurality of different speed ratios and to neutral, shifting means comprising a motor connected to the transmission to shift it, a movable member, means responsive to the speed of a part of the transmission to move the member, electrical means controlled by the member to control the motor to shift the transmission to different speed ratios, electrical means to control the motor to shift the transmission into neutral, a circuit to energize the electrical means, the first named electrical means controlling the motor when energized and the last named electrical means controlling the motor when de-energized, a switch in the circuit operable simultaneously with the ignition switch of an engine driving the transmission to de-energize all of the electrical means when the ignition switch is opened, and a second switch in the circuit responsive to a function of the operation of the engine to de-energize all of the electrical means when the engine stops.

15. In a transmission having shiftable parts to produce any one of a plurality of different driving ratios, shifting means comprising fluid motor means connected to said parts to shift them, valve means to control the fluid motor means, control means for the valve means movable to different positions, means responsive to the speed of one part of the transmission to move the control means, means including a manually operable part to modify the effect of the speed responsive means on the control means, and manually operable means to control the operation of the valve means independently of the control means.

16. In a transmission shiftable to at least four different speed ratios, shifting means movable to four different positions to shift the transmission to said four different speed ratios, control means for the shifting means responsive to the speed of a part of the transmission to control the shifting means to shift the transmission successively from the lowest to the highest of its speed ratios as the speed of the part increases, a manually operable control member, and means operated by the control member when the shifting means is in either its second or third position to control the shifting means to shift the transmission to its next lower ratio, said control means including means for rendering the operated means ineffective to control the shifting means to shift the transmission to said next lower ratios when the control means is in a predetermined position.

17. In a transmission shiftable to at least three different speed ratios, shifting means movable to three different positions to shift the transmission to said three different speed ratios, a plurality of control devices for the shifting means selectively operable respectively to cause the shifting means to move to said three different positions, control means movable in response to the speed of a part of the transmission, operative connections from the control means to the control devices to operate the control devices to shift the transmission successively from the lowest to the highest of its speed ratios as the speed of the part increases, a manually operable control member, and means operated by the control member when the transmission is in either of its two higher speed ratios to change said connections thereby to operate the control device for the next lower speed ratio without changing the position of the control means.

ADIEL Y. DODGE.

REFERENCES CITED

The following references are of record in the file of this patent:

UNITED STATES PATENTS

| Number | Name | Date |
|---|---|---|
| Re. 21,844 | Vetter | June 24, 1941 |
| 843,076 | Detrick | Feb. 5, 1907 |
| 1,701,395 | Short | Feb. 5, 1929 |
| 1,839,145 | Forichon | Dec. 29, 1931 |
| 1,893,644 | Fleischel | Jan. 10, 1933 |
| 2,076,791 | Platt | Apr. 13, 1937 |
| 2,103,540 | Livermore | Dec. 28, 1937 |
| 2,120,104 | Livermore | June 7, 1938 |
| 2,195,365 | Getaz | Mar. 26, 1940 |
| 2,252,009 | Kenny | Aug. 12, 1941 |
| 2,252,644 | Robin et al. | Aug. 12, 1941 |
| 2,277,800 | Syrovy | Mar. 31, 1942 |
| 2,343,955 | Cotterman | Mar. 14, 1944 |